US010784683B2

(12) United States Patent
Dong et al.

(10) Patent No.: US 10,784,683 B2
(45) Date of Patent: Sep. 22, 2020

(54) METHOD OF CONTROLLING ELECTRICAL POWER SYSTEM AND APPARATUS USING THE SAME

(71) Applicant: Delta Electronics (Shanghai) CO., LTD, Shanghai (CN)

(72) Inventors: Mingxuan Dong, Shanghai (CN); Changyong Wang, Shanghai (CN); Aibin Qiu, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 154 days.

(21) Appl. No.: 15/990,063

(22) Filed: May 25, 2018

(65) Prior Publication Data

US 2019/0123559 A1 Apr. 25, 2019

(30) Foreign Application Priority Data

Oct. 23, 2017 (CN) .......................... 2017 1 0993085

(51) Int. Cl.
*H02J 3/28* (2006.01)
*H02J 7/00* (2006.01)
*H02M 7/797* (2006.01)
*H02J 3/32* (2006.01)
*H02J 3/38* (2006.01)
(Continued)

(52) U.S. Cl.
CPC ........ *H02J 3/28* (2013.01); *H02J 3/32* (2013.01); *H02J 7/0068* (2013.01); *H02M 5/4585* (2013.01); *H02M 7/797* (2013.01); *H02P 9/007* (2013.01); *H02J 3/386* (2013.01); *H02J 7/345* (2013.01); *H02M 2001/008* (2013.01); *H02P 2101/15* (2015.01); *H02P 2207/073* (2013.01)

(58) Field of Classification Search
CPC .. H02J 3/28; H02J 3/386; H02J 3/1892; H02J 3/16; H02J 7/00; H02J 7/0068; H02J 7/345; H02M 7/797; F03D 9/255; H02P 27/08; H02P 27/04; H02P 6/14
USPC ...................... 307/20, 80, 82, 9.1, 10.1, 149
See application file for complete search history.

(56) References Cited

U.S. PATENT DOCUMENTS

2010/0157632 A1* 6/2010 Batten ...................... H02J 3/386
363/74
2014/0103851 A1* 4/2014 Arefeen .............. H02M 7/5387
318/503
(Continued)

FOREIGN PATENT DOCUMENTS

CN 103401463 A 11/2013
CN 105226727 A 1/2016
(Continued)

*Primary Examiner* — Rexford N Barnie
*Assistant Examiner* — Jagdeep S Dhillon
(74) *Attorney, Agent, or Firm* — Yunling Ren

(57) ABSTRACT

The present application provides a method of controlling an electrical power system and an apparatus using the same. The electrical power system includes a DC bus and a DC bus capacitor connected to the DC bus. The method includes: receiving a virtual DC bus capacitance value of the DC bus capacitor; detecting a DC bus voltage; calculating an expected value of a DC bus current based on the virtual DC bus capacitance value and the DC bus voltage; and adjusting the DC bus current, so that the DC bus current reaches the expected value and thus the DC bus capacitor is equivalent to the virtual DC bus capacitance value.

20 Claims, 9 Drawing Sheets

(51) Int. Cl.
*H02M 5/458* (2006.01)
*H02P 9/00* (2006.01)
H02J 7/34 (2006.01)
H02M 1/00 (2006.01)
H02P 101/15 (2016.01)

(56) References Cited

U.S. PATENT DOCUMENTS

| | | | | |
|---|---|---|---|---|
| 2014/0306563 | A1* | 10/2014 | Oyama | H02K 3/28 |
| | | | | 310/71 |
| 2015/0311853 | A1* | 10/2015 | Swamy | H02M 1/15 |
| | | | | 318/504 |
| 2017/0257049 | A1* | 9/2017 | Jing | H02P 6/14 |
| 2018/0233914 | A1* | 8/2018 | Miki | G05B 13/026 |
| 2019/0036343 | A1* | 1/2019 | Nelson | H02J 3/12 |
| 2019/0072070 | A1* | 3/2019 | Wang | F03D 9/25 |

FOREIGN PATENT DOCUMENTS

| | | |
|---|---|---|
| CN | 105634003 A | 6/2016 |
| JP | 2016158339 A | 9/2016 |

\* cited by examiner

METHOD OF CONTROLLING ELECTRICAL POWER SYSTEM AND APPARATUS USING THE SAME

CROSS REFERENCE TO RELATED APPLICATIONS

The present application is based upon and claims priority to Chinese Patent Application No. 201710993085.1, filed on Oct. 23, 2017, the entire contents of which are incorporated herein by reference.

TECHNICAL FIELD

The present application relates to the field of power electronics technology, and in particular, to a method of controlling an electrical power system and an apparatus of controlling the electrical power system using the method.

BACKGROUND

Wind power generation relies on meteorological conditions and gradually merges into the power grid in a form of large-scale wind farms. The penetration rate of the wind power generation is higher and higher, which brings various impacts on the power grid and leads to a reduction in the stability of the power grid. When a DC bus capacitor is introduced into the stability analysis of the electrical power system, it appears that the bus capacitor interacts with other wind turbines, DC transmission, synchronous machine shafts, etc., resulting in sub-synchronous oscillation of the wind power generation system, which seriously threatens the stability of the electrical power system.

Some scholars have proposed dynamic stability analysis of the amplitude and phase of a power electronized electrical power system containing a wind generating set, which introduces the DC bus capacitor into the stability analysis of the electrical power system. The power electronized equipment also has internal potential, whose stability problem is also shown as the voltage power angle stability problem, which mainly includes three aspects of dynamic analysis, namely, rotor speed control, DC voltage control and AC current control. Through the stability analysis, it is concluded that the greater a loop bandwidth of the DC bus voltage is, the greater the contribution to the system stability will be. Without changing the actual bandwidth, the smaller the bus capacitance is, the greater the contribution to the system stability will be.

SUMMARY

The present application aims to provide a method of controlling an electrical power system and an apparatus of controlling the electrical power system using the method, so as to overcome the stability problem of the electrical power system due to limitations and disadvantages of the related art to a certain extent.

Other features and advantages of the present application will be apparent from the following detailed description, or may be learned in part through the practice of the present application.

According to one aspect of the present application, a method of controlling an electrical power system is provided, wherein the electrical power system includes a DC bus and a DC bus capacitor connected to the DC bus, and the method includes:

a setting step, receiving a virtual DC bus capacitance value of the DC bus capacitor:

a detecting step, detecting a DC bus voltage:

a calculating step, calculating an expected value of a DC bus current based on the virtual DC bus capacitance value and the DC bus voltage; and an adjusting step, adjusting the DC bus current, so that the DC bus current reaches the expected value and thus the DC bus capacitor is equivalent to the virtual DC bus capacitance value.

According to another aspect of the present disclosure, an apparatus of controlling an electrical power system is provided, wherein the electrical power system includes a DC bus and a DC bus capacitor connected to the DC bus, and the apparatus includes:

a setting module, configured to receive a virtual DC bus capacitance value of the DC bus capacitor;

a detecting module, configured to detect a DC bus voltage;

a calculating module, configured to calculate an expected value of a DC bus current based on the virtual DC bus capacitance value and the DC bus voltage; and an adjusting module, configured to adjust the DC bus current, so that the DC bus current reaches the expected value and thus the DC bus capacitor is equivalent to the virtual DC bus capacitance value.

An actual DC bus capacitance value is fixed. Considering the high-frequency ripple, the capacitance should not be excessively reduced. Therefore, the present application proposes a virtual DC bus capacitor technology, by which, a DC bus capacitor is virtualized at a low frequency to change the actual bus capacitance value as required, thus further improving the grid-connection stability. On the other hand, if the stability problem is not considered, a positive capacitor may also be virtualized to reduce the cost of DC bus capacitor.

For a better understanding of features and technical contents of the present application, please refer to the following detailed description of the present application and the accompanying drawings, but the detailed description and drawings herein are merely used to illustrate the present application and not to limit the scope of claims of the present application.

BRIEF DESCRIPTION OF THE DRAWINGS

The above and other features and advantages of the present disclosure will become more apparent by describing its exemplary embodiments in detail with reference to the accompanying drawings.

DETAILED DESCRIPTION

Figure 1A:
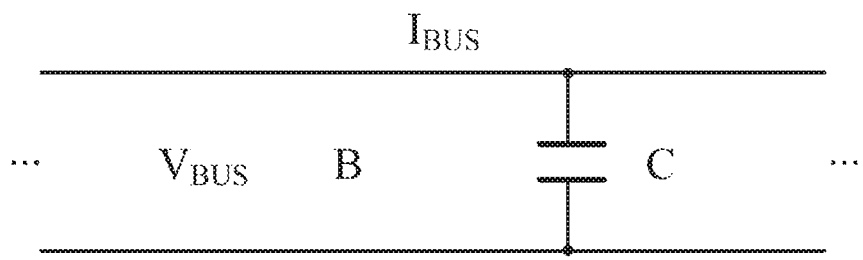
FIG. 1A is a partial schematic diagram of an electrical power system 1000.

Exemplary embodiments will now be described more fully with reference to the drawings. The exemplary embodiments, however, may be implemented in various forms, and should not be construed as been limited to the implementations set forth herein; instead, the implementations are provided such that the present disclosure will be thorough and complete, and will fully convey the concept of exemplary embodiments to those skilled in the art. In the drawings, the same reference signs denote the same or similar structures, thus their detailed description will be omitted.

In addition, the features, structures or characteristics described herein can be combined in one or more embodiments in any appropriate way. In the description hereinafter, many specific details are provided for fully understanding of the embodiments of the present disclosure. However, it will be appreciated by those skilled in the art that the technical solution of the present disclosure can be practiced without one or more of the specific details, or with other structures, components, steps or methods, etc. In addition, known structures, components or operations will not be illustrated or described in detail, to avoid obscuration of the aspects of the present disclosure.

In addition, in the following drawings, if there is a cross between solid line segments as connection wires or dotted line segments as signal lines, a black dot "●" at the cross indicates that the cross point is a wire connection point or a merge-split point of the signal line, no black dot "●" on the cross means that the cross point is not a wire connection point or a merge-split point of the signal line, but merely traverse over each other. Various arrows indicate the flow of the respective current, signal or step, respectively. The notation of each element or signal not only represents the element or signal itself, but also represents an algebraic sign of the capacity or size of the element or signal.

The present application intends to eliminate the existence condition of the sub-synchronous oscillation by changing operating parameters of the electrical power system in real time, according to the study of the above-described instability problem in the electrical power system involving wind power generation. This application intends to solve the above problems by controlling the operating parameters of the DC bus. Specifically, the capacitance value of the DC bus capacitor is changed in a virtual manner in real time, such that a virtual DC bus capacitor technology based on current control is proposed. The virtual DC bus capacitor technology of the present application is essentially a method of controlling an electrical power system, and an apparatus using the method to control the electrical power system.

A method of controlling the electrical power system and an apparatus of controlling the electrical power system using the method of the present application will be described in detail below with reference to FIGS. 1A-4B.

First, one embodiment of a method of controlling the electrical power system of the present application is described with reference to FIGS. 1A and 1B.

FIG. 1A is a partial schematic diagram of an electrical power system 1000. The electrical power system 1000 in FIG. 1A at least includes: a DC bus B and a DC bus capacitor C. As shown in FIG. 1A, the DC bus capacitor C is connected to the DC bus B.

An actual electrical power system 1000 may further include other power electronic devices. However, under the premise that those skilled in the art can understand, descriptions of other power electronic devices are temporarily ignored in the first embodiment, in order to make the method of controlling the electrical power system of the present application easier be understood and not drown the essence of the present disclosure due to overly complicated description. The ignored power electronic devices are only indicated by ellipses.

When the electrical power system 1000 operates, the DC bus voltage $V_{BUS}$ and the DC bus current $I_{BUS}$ are generated on the DC bus.

Figure 1B:
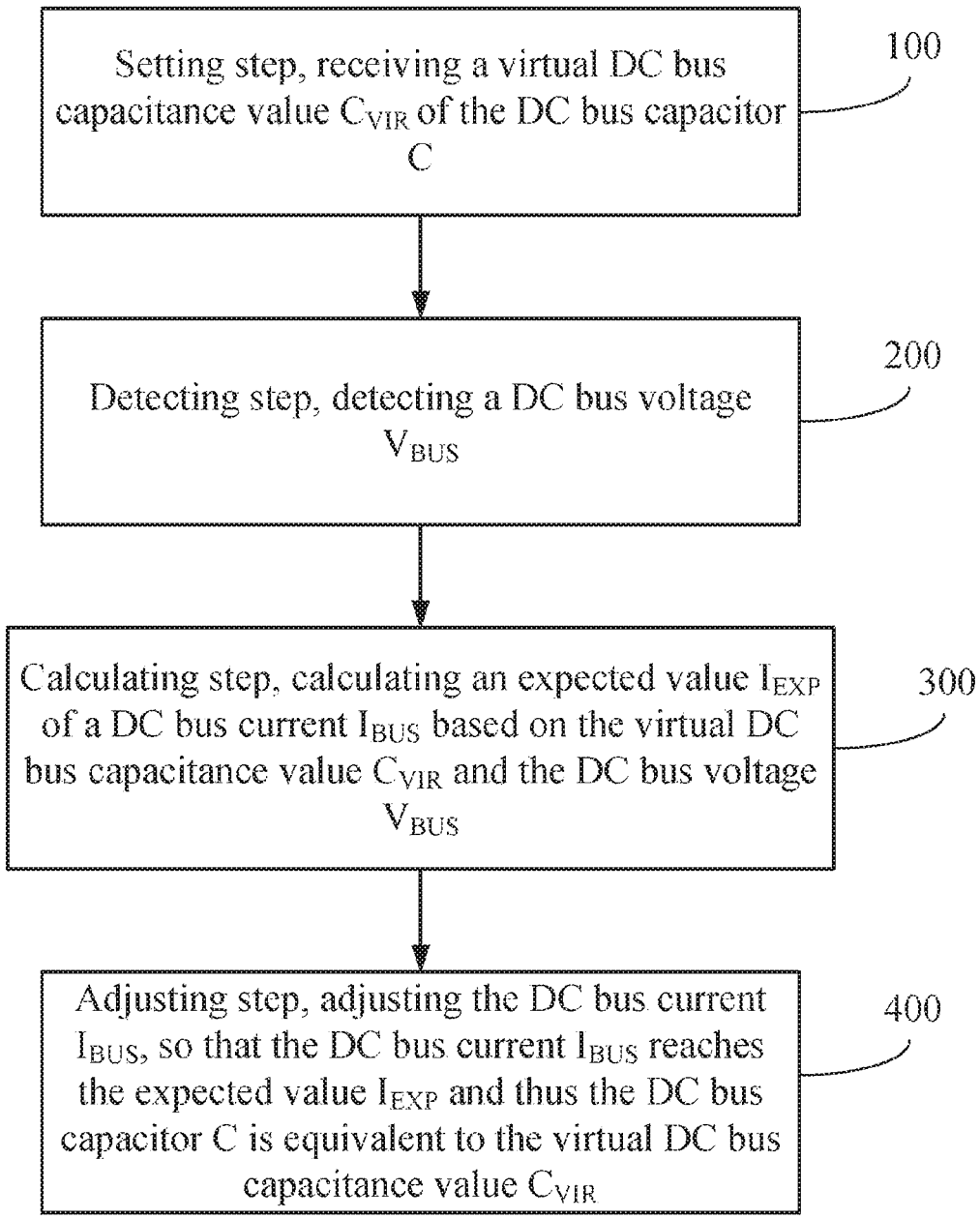
FIG. 1B is a flowchart of one embodiment of a method of controlling an electrical power system of the present application.

FIG. 1B is a flowchart of one embodiment of a method of controlling an electrical power system of the present application. As shown in FIG. 1B, the method of controlling the electrical power system of this embodiment includes: a setting step 100, a detecting step 200, a calculating step 300, and an adjusting step 400.

In the setting step 100, a virtual DC bus capacitance value $C_{VIR}$ set for the DC bus capacitor C is received.

Herein, the virtual DC bus capacitance value $C_{VIR}$ is both an expected value and an equivalent value. Specifically, in order to eliminate or suppress sub-synchronous oscillation in the electrical power system 1000, it is desirable to change the capacitance value of the DC bus capacitor C to be the virtual DC bus capacitance value $C_{VIR}$, thereby making the sub-synchronous oscillation away from resonance as far as possible. However, in an actual circuit, the capacitance value of the DC bus capacitor C will not change arbitrarily. Therefore, the present application expects to make the capacitance value of the DC bus capacitor C be equivalent to the virtual DC bus capacitance value $C_{VIR}$ by controlling other operating parameters of the DC bus.

In the detecting step 200, the DC bus voltage $V_{BUS}$ is detected.

As another embodiment, the detected DC bus voltage $V_{BUS}$ may be filtered by a first-order small inertia element prior to the use.

In the calculating step 300, an expected value $I_{EXP}$ of the DC bus current $I_{BUS}$ is calculated based on the virtual DC bus capacitance value $C_{VIR}$ and the DC bus voltage $V_{BUS}$.

In the adjusting step 400, the DC bus current $I_{BUS}$ is adjusted, so that the DC bus current $I_{BUS}$ reaches the expected value $I_{EXP}$ and thus the DC bus capacitor C is equal to the virtual DC bus capacitance value $C_{VIR}$.

Since the capacitor exhibits a low impedance to an abruptly changed voltage, the change of the DC bus current $I_{BUS}$ caused by the change of the DC bus voltage $V_{BUS}$ is mainly the change of current flowing through the DC bus capacitor C. In this application, by controlling the DC bus current $I_{BUS}$, the DC bus current $I_{BUS}$ reaches the expected value $I_{EXP}$, so that the capacitance value of the DC bus capacitor C is equivalent to the virtual DC bus capacitance value $C_{VIR}$, which is equivalent to changing the capacitance value of the DC bus capacitor C to be the virtual DC bus capacitance value $C_{VIR}$.

Externally expressed characteristics of the DC bus capacitor C are reflected in the relationship between the capacitance value C of the DC bus capacitor C, a voltage $u_{dc}$ applied across the DC bus capacitor C, and a current $i_{dc}$ flowing through the DC bus capacitor C, which is shown in the following formula (1):

$$i_{dc} = D\frac{du_{dc}}{dt} \qquad (1)$$

In the present application, by approximating the voltage $u_{dc}$ applied across the DC bus capacitor C in the above formula (1) as the DC bus voltage $V_{BUS}$, and setting the capacitance value C of the DC bus capacitor C as the virtual DC bus capacitance value $C_{VIR}$, the expected value $I_{EXP}$ of the DC bus current is calculated, which corresponds to $i_{dc}$ in formula (1). By controlling the DC bus current $I_{BUS}$, the DC bus current $I_{BUS}$ reaches the expected value $I_{EXP}$, and then the externally expressed characteristics of the DC bus capacitor C may be equivalent to the case when the capacitance value is the virtual DC bus capacitance value $C_{VIR}$.

Figure 2A:
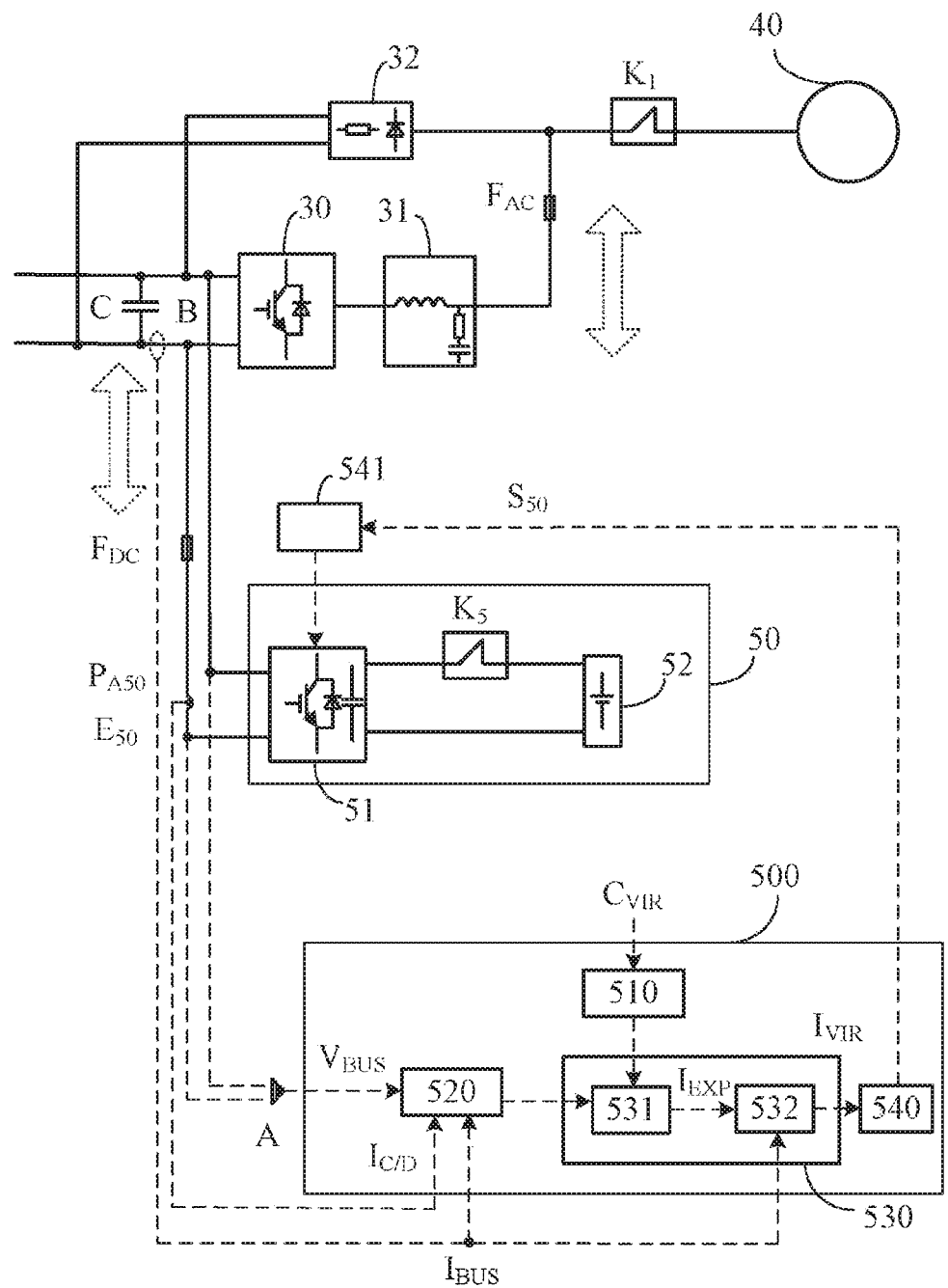
FIG. 2A is a schematic diagram of a three-phase electrical power system 2000A according to an embodiment of the present application.

FIG. 2A is a schematic diagram of a three-phase electrical power system 2000A according to an embodiment of the present application. As shown in FIG. 2A, the three-phase electrical power system 2000A includes a DC bus capacitor C, a three-phase inverter 30, an energy storage module 50, and an apparatus 500 of controlling the electrical power system. The DC bus capacitor C is connected to the three-phase inverter 30 through the DC bus B. The energy storage module 50 is connected in parallel with the DC bus B to store electrical energy $E_{50}$ provided by the DC bus B or provide the electrical energy $E_{50}$ to the DC bus B. The apparatus 500 of controlling the electrical power system is connected to the DC bus B and the energy storage module 50.

The three-phase electrical power system 2000A may further include auxiliary devices such as a contactor $K_1$, an LC filter 31, a soft start module 32, an AC fuse $F_{AC}$, and a DC fuse $F_{DC}$. The reference numeral 40 indicates a grid. They are connected as shown in the figure. Since these devices themselves are not related to the present disclosure, their structures are not described.

The dashed arrows in FIG. 2A indicate the flow of current, electrical energy, or power. As shown in FIG. 2A, the energy storage module 50 includes a charging/discharging unit 51, an energy storage element 52, and a circuit breaker $K_5$. The charging/discharging unit 51 may be a bidirectional DC/DC converter of various topologies. When the energy storage module 50 is in operation, the charging/discharging unit 51 has a charging/discharging current $I_{C/D}$, which charges the energy storage module 50 from the DC bus B or discharges the energy storage module 50 to the DC bus B. The DC bus B charges the energy storage module 50 or the energy storage module 50 discharges to the DC bus B in an active power $P_{A50}$. A person skilled in the art knows how to connect the internal elements of the energy storage module 50, and therefore will not be described in details.

As shown in FIG. 2A, the apparatus 500 of controlling the electrical power system includes: a setting module 510, a detecting module 520, a calculating module 530, and an adjusting module 540.

The setting module 510 is configured to receive a virtual DC bus capacitance value $C_{VIR}$ of the DC bus capacitor C. The setting module 510 may be various input devices having knobs, joysticks, buttons, mice, keyboards, touch pads, touch screens, and the like.

The detecting module 520 is configured to detect the DC bus voltage $V_{BUS}$, the DC bus current $I_{BUS}$, and the charging/discharging current $I_{C/D}$ of the energy storage module 50. The detecting module 520 may be various sensors or detectors for voltage, current or power.

The calculating module 530 includes two calculating units which are a first reference current calculating unit 531 and a second reference current calculation unit 532. The first reference current calculating unit 531 is configured to calculate an expected value $I_{EXP}$ of a DC bus current based on the virtual DC bus capacitance value $C_{VIR}$ and the DC bus voltage $V_{BUS}$. The second reference current calculation unit 532 is configured to subtract the actual DC bus current $I_{BUS}$ from the expected value $I_{EXP}$ of the DC bus current, so as to obtain a virtual current value $I_{VIR}$. The calculating module 530 may be various computing devices, software modules or firmware modules, such as an operating circuit, a processor or a computer.

The adjusting module 540 is configured to adjust the charging/discharging current $I_{C/D}$, such that the charging/discharging current $I_{C/D}$ reaches the virtual current value $I_{VIR}$. An adjusting process of the charging/discharging current $I_{C/D}$ essentially behaves as injecting a positive or negative current into the DC bus B, so that the DC bus current $I_{BUS}$ reaches the expected value $I_{EXP}$. Then the DC bus capacitor C presents a virtual DC bus capacitance value $C_{VIR}$. The adjusting module 540 may be a variety of output devices, software modules or firmware modules, such as signal generators, signal controllers, signal amplifiers.

As another embodiment, the apparatus 500 of controlling the electrical power system may further include a first-order small inertia element A, so as to filter the detected DC bus voltage $V_{BUS}$ by the first-order small inertia element. The first-order small inertia element may be integrated in the detecting module 520.

In addition, the apparatus 500 of controlling the electrical power system may further include a driving module 541, which converts a signal $S_{50}$ output by the adjusting module 540 into PWM signals to driving switches (such as transistors). The PWM signals output by the driving module 541 control power switches in the charging/discharging unit 51 so that the charging/discharging current $I_{C/D}$ reaches the virtual current value $I_{VIR}$. For example, the PWM signals control a duty cycle of each power switch to adjust the charging/discharging current $I_{C/D}$, so that the charging/discharging current $I_{C/D}$ reaches the virtual current value $I_{VIR}$. The driving module 541 may also be a part of the electrical power system.

Figure 2B:
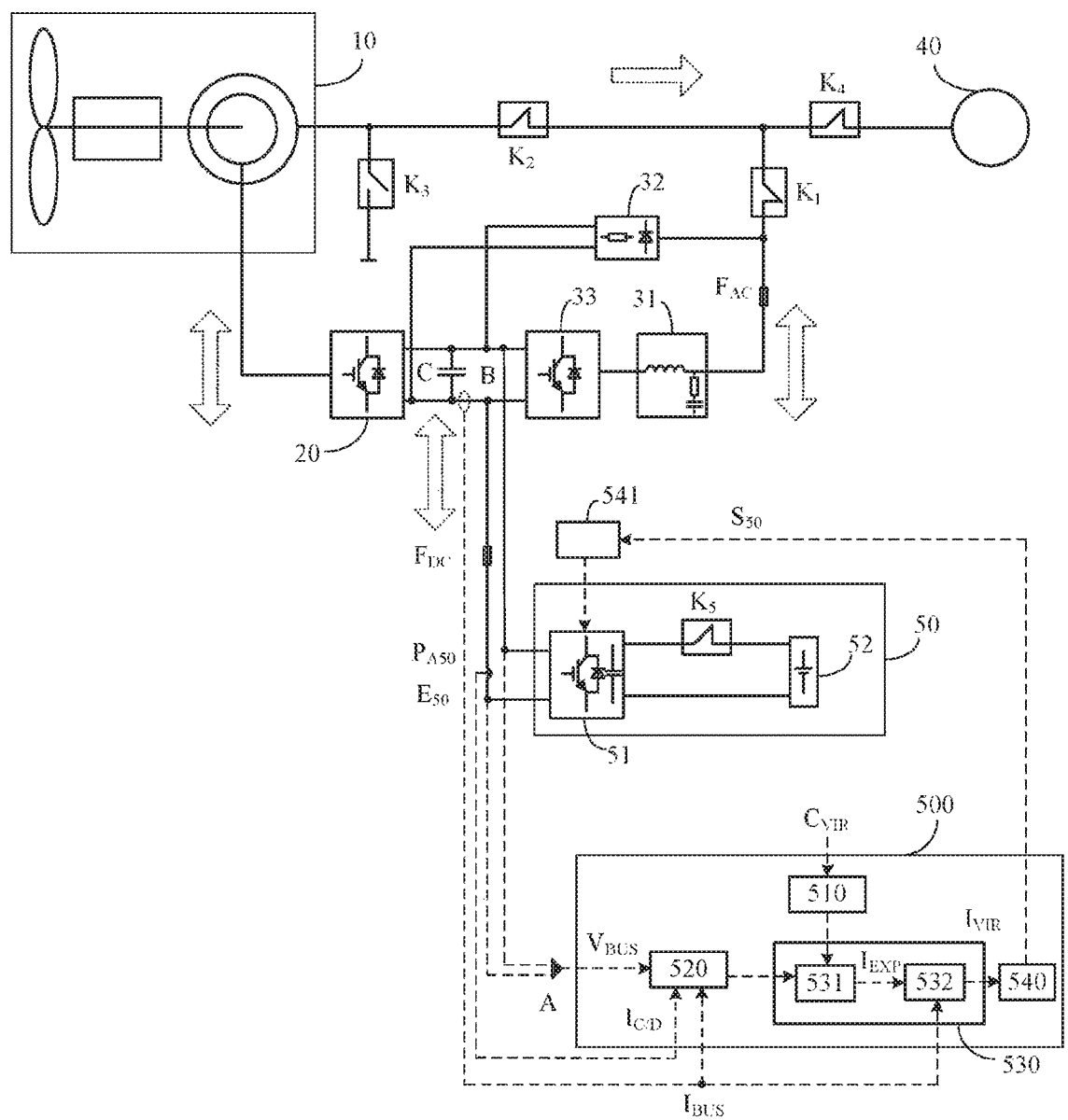
FIG. 2B is a schematic diagram of the electrical power system of the present application being a wind power generation system 2000B.

FIG. 2B is a schematic diagram of the electrical power system of the present application being a wind power generation system 2000B. As shown in FIG. 2B, the wind power generation system 2000B mainly includes: a wind generator 10, a generator-side power converter 20, a grid-side power converter 33, a grid 40, an energy storage module 50, and an apparatus 500 of controlling the electrical power system. The DC bus capacitor C is connected between the generator-side power converter 20 and the grid-side power converter 33 through the DC bus B. The energy storage module 50 is connected in parallel with the DC bus B, to store electrical energy $E_{50}$ provided by the DC bus B or provide the electrical energy $E_{50}$ to the DC bus B. The apparatus 500 of controlling the electrical power system is connected to the DC bus B and the energy storage module 50.

The wind power generation system 2000B may further include auxiliary devices such as contactors $K_1$-$K_3$, a main breaker $K_4$, an LC filter 31, a soft start module 32, an AC fuse $F_{AC}$ and a DC fuse $F_{DC}$, whose connection relationships are as shown in the figure. Since these devices themselves are not related to the present disclosure, their structures are not described. It should be noted that, the wind power generation system 2000B shown in FIG. 2B is a doubly-fed wind power generation system, but the present application is not limited thereto. For example, the wind power generation system 2000B may also be a full-power wind power generation system.

In an actual electrical power system, the generator-side power converter 20 may be various bidirectional AC-DC converters that can be controlled by power switching elements. The grid-side power converter 33 may be various bidirectional DC-AC inverters that can be controlled by power switching elements. However, internal composition details of the generator-side power converter 20 and the grid-side power converter 33 are not related to the present disclosure. Therefore, under the premise that those skilled in the art can understand, in order to avoid drowning the essence of the present disclosure due to overly complicated description, internal details of the generator-side power converter 20 and the power-side power converter 33 are omitted herein.

The energy storage module 50 includes a charging/discharging unit 51, an energy storage element 52 and a circuit breaker $K_5$. The charging/discharging unit 51 may be a bidirectional DC/DC converter of various topologies. The energy storage element 52 may be constituted by a super capacitor or a rechargeable battery, but not limited thereto. When the energy storage module 50 is in operation, the charging/discharging unit 51 charges the energy storage module 50 from the DC bus B or discharges the energy storage module 50 to the DC bus B with a charging/discharging current $I_{C/D}$. That is to say, the DC bus B charges the energy storage module 50 or the energy storage module 50 discharges to the DC bus B in an active power $P_{A50}$.

The energy storage module 50 may be disposed inside a converter which is a device including the generator-side power converter 20 and the grid-side power converter 33, forming a wind storage integrated machine. The energy storage module 50 does not change original topology and control structures of the wind power generation system. The generator-side power converter 20 and the energy storage module 50 share the grid-side power converter 33, the LC filter 31, other converters, and the like (not shown in the drawings), to save cost. A person skilled in the art knows the internal connection of the energy storage module 50, and therefore will not be described in details.

The AC side of the generator-side power converter 20 is connected to a rotor winding of the wind generator 10, and the AC side of the grid-side power converter 33 is connected to the grid 40 through the LC filter 31, the AC fuse $F_{AC}$, the contactor $K_1$ and the main breaker $K_4$. The stator winding of the wind generator 10 is connected to ground through the contactor $K_3$, and to the grid 40 through the contactor $K_2$ and the main breaker $K_4$. The dashed arrow in FIG. 2B indicates the flow of current, electrical energy, or power.

As shown in FIG. 2B, the apparatus 500 of controlling an electrical power system of this embodiment includes: a setting module 510, a detecting module 520, a calculating module 530, and an adjusting module 540.

The setting module 510 is configured to receive a virtual DC bus capacitance value $C_{VIR}$ of the DC bus capacitor C. The setting module 510 may be various input devices having knobs, joysticks, buttons, mice, keyboards, touch pads, touch screens, and the like.

The detecting module 520 is configured to detect the DC bus voltage $V_{BUS}$, the DC bus current $I_{BUS}$, and the charging/discharging current $I_{C/D}$. The detecting module 520 may be various sensors or detectors for such as voltage, current or power.

The calculating module 530 includes two calculating units which are a first reference current calculating unit 531 and a second reference current calculation unit 532. The first reference current calculating unit 531 is configured to calculate an expected value $I_{EXP}$ of the DC bus current based on the virtual DC bus capacitance value $C_{VIR}$ and the DC bus voltage $V_{BUS}$. The second reference current calculation unit 532 is configured to subtract the actual DC bus current $I_{BUS}$ from the expected value $I_{EXP}$ of the DC bus current, to obtain a virtual current value $I_{VIR}$. The calculating module 530 may be various computing devices, software modules or firmware modules of an operating circuit, a processor or a computer.

The adjusting module 540 is configured to adjust the charging/discharging current $I_{C/D}$, such that the charging/discharging current $I_{C/D}$ reaches the virtual current value $I_{VIR}$. An adjusting process of the charging/discharging current $I_{C/D}$ essentially behaves as injecting a positive or negative current into the DC bus B, so that the DC bus current $I_{BUS}$ reaches the expected value $I_{EXP}$. Then the DC bus capacitor C presents a virtual DC bus capacitance value $C_{VIR}$. The adjusting module 540 may be a variety of output devices, software modules or firmware modules, such as signal generators, signal controllers, signal amplifiers.

As another embodiment, the apparatus 500 of controlling the electrical power system may further include a first-order small inertia element A, so as to filter the detected DC bus voltage $V_{BUS}$ by the first-order small inertia element. The first-order small inertia element may be integrated in the detecting module 520.

In addition, the apparatus 500 of controlling the electrical power system of the present application may further include a driving module 541, which converts a signal $S_{50}$ output by the adjusting module 540 into PWM signals to driving a switches (such as transistors). The PWM signals output by the driving module 541 control power switches in the charging/discharging unit 51. For example, the PWM signals control a duty cycle of each power switch to adjust the charging/discharging current $I_{C/D}$, so that the charging/discharging current $I_{C/D}$ reaches the virtual current value $I_{VIR}$. The driving module 541 may also be a part of the electrical power system.

With reference to the descriptions of FIGS. 2A and 2B, embodiments of the method of controlling an electrical power system of the present application are described below with further reference to FIG. 2C.

Figure 2C:
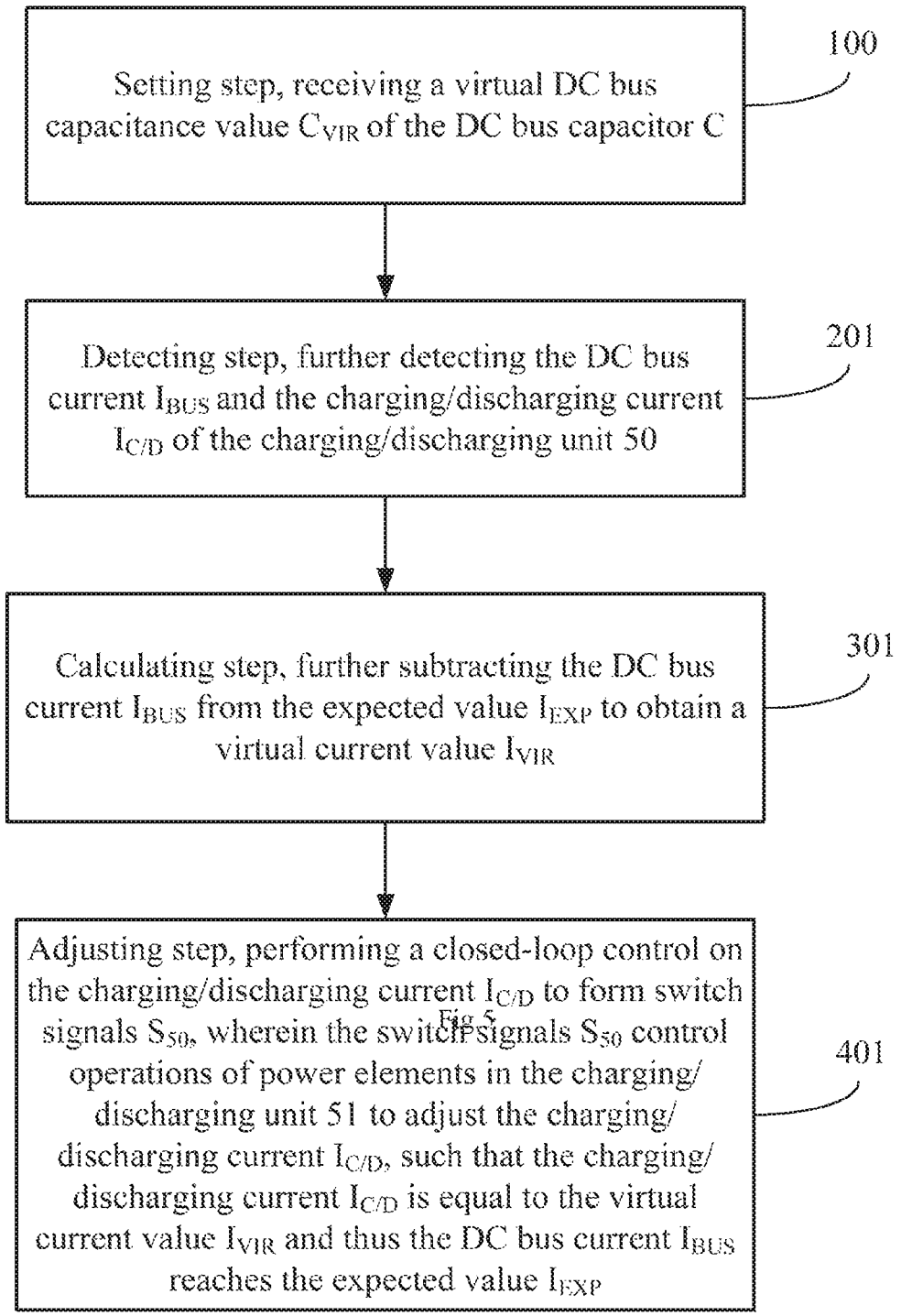
FIG. 2C is a flowchart of another embodiment of a method of controlling an electrical power system of the present application.

FIG. 2C is a flowchart of another embodiment of a method of controlling an electrical power system of the present application. As shown in FIG. 2C, the method of controlling the electrical power system of this embodiment includes: a setting step 100, a detecting step 201, a calculating step 301, and an adjusting step 401.

The setting step 100, the detecting step 201, the calculating step 301, and the adjusting step 401 in FIG. 2C are similar to the foregoing setting step 100, detecting step 200, calculating step 300, and adjusting step 400 in FIG. 1B. The same parts are not described repeatedly, and only the difference will be emphasized.

In the adjusting step 401 of this embodiment, the active power $P_{A50}$ charged from the DC bus B to the energy storage module 50 or discharged from the energy storage module 50 to the DC bus B is controlled. The energy storage module 50 stores the electrical energy $E_{50}$ drawn from the DC bus B or provides the electrical energy $E_{50}$ to the DC bus B, so as to adjust the DC bus current $I_{BUS}$. In the adjusting step 401, the active power $P_{A50}$ charged from the DC bus to the energy storage module is controlled, which makes the energy storage module draw electrical energy from the DC bus so as to adjust the DC bus current. Or in the adjusting step 401, the active power $P_{A50}$ discharged from the energy storage module to the DC bus is controlled, which makes the energy storage module provide electrical energy to the DC bus so as to adjust the DC bus current.

As another embodiment of the method of controlling the electrical power system of the present application, in the detecting step 201, the DC bus current $I_{BUS}$ and the charging/discharging current $I_{C/D}$ of the charging/discharging unit 50 are further detected.

In the calculating step 301, the DC bus current $I_{BUS}$ is further subtracted from the expected value $I_{EXP}$ to obtain a virtual current value $I_{VIR}$.

In the adjusting step 401, a closed-loop control is performed on the charging/discharging current $I_{C/D}$ to form switch signals $S_{50}$. The switch signals $S_{50}$ control operations of each power element in the charging/discharging unit 51 to adjust the charging/discharging current $I_{C/D}$, such that the charging/discharging current $I_{C/D}$ is equal to the virtual current value $I_{VIR}$. Thus the DC bus current $I_{BUS}$ reaches the expected value $I_{EXP}$.

Figure 3A:
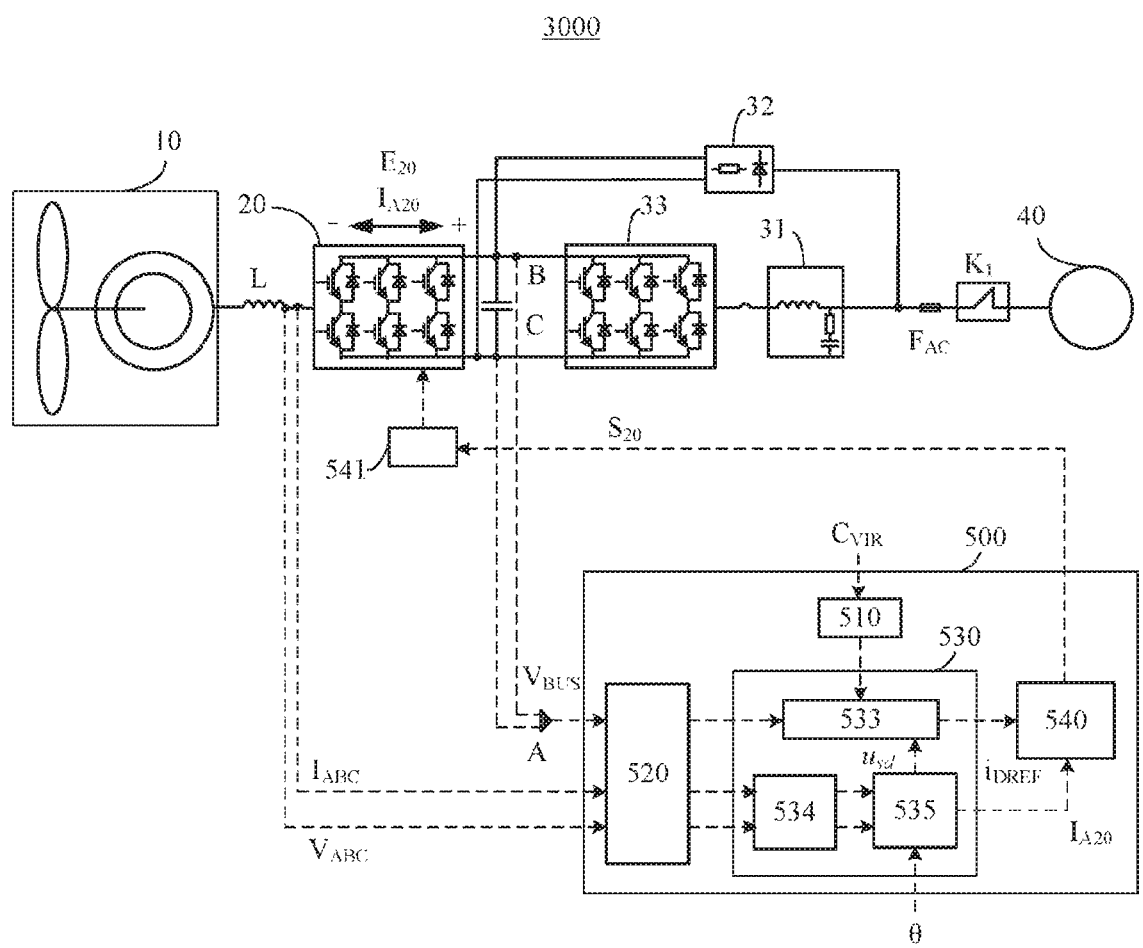
FIG. 3A is a schematic diagram of the electrical power system of the present application being a wind power generation system 3000.

A further embodiment of the electrical power system of the present application is described below with further reference to FIGS. 3A and 3B. FIG. 3A is a schematic diagram of the electrical power system of the present application being a wind power generation system 3000. As shown in FIG. 3A, the wind power generation system 3000 is a full-power power generation system, but not limited thereto. The wind power generation system 3000 mainly includes: a wind generator 10, a generator-side power converter 20, a grid-side power converter 33, an apparatus 500 of controlling the electrical power system, and a grid 40. The DC bus capacitor C is connected between the generator-side power converter 20 and the grid-side power converter 33 through the DC bus B. The apparatus 500 of controlling the electrical power system is connected to the DC bus B and the generator-side power converter 20.

The wind power generation system 3000 may further include auxiliary devices such as a wind generator output inductor L, a contactors $K_1$, an LC filter 31, a soft start module 32, and an AC fuse $F_{AC}$, whose connection relationships are as shown in the figure. Since these devices themselves are not related to the present disclosure, their structures are not described.

The AC side of the generator-side power converter 20 is connected to the wind generator 10 through the wind generator output inductance L, and the AC side of the grid-side power converter 33 is connected to the grid 40 through the LC filter 31, the AC fuse $F_{AC}$ and the contactor $K_1$. The solid arrows in FIG. 3A indicate the flow of current, electrical energy and power.

The apparatus 500 of controlling the electrical power system controls the active current $I_{A20}$ between the generator-side power converter 20 and the DC bus B, such that the active current $I_{A20}$ is a positive or negative current. Then the generator-side power converter 20 draws electrical energy $E_{20}$ from the DC bus B or provides the electrical energy $E_{20}$ to the DC bus B, to adjust the DC bus current $I_{BUS}$.

According to a current model of the three-phase converter, a Q-axis voltage $u_{sq}$ of the AC side of the converter in the DQ rotating coordinate system becomes zero after the AC side voltage of the converter is phase locked and the D axis is oriented in the DQ rotating coordinate system.

Therefore, in the case of ignoring conduction loss and switching loss of the power switching devices in the converter, a D-axis current $i_{dref}$ on the AC side of the converter in the DQ rotating coordinate system, a voltage $u_{dc}$ applied to the DC bus (i.e., a voltage applied across the DC bus capacitor C), a D-axis voltage $u_{sd}$ on the AC side of the converter in the DQ rotating coordinate system, and a current $i_{dc}$ flowing through the DC bus (i.e., approximate to the current flowing through the DC bus capacitor C) have a proportional relationship, as shown in formula (2) below:

$$i_{dref} = \frac{2}{3} \frac{u_{dc}}{u_{sd}} i_{dc} \qquad (2)$$

The above coordinate transformation is performed on the AC side voltage and the AC side current of the generator-side power converter 20, and then the D-axis current $i_{dref}$ on the AC side of the converter in the above formula (2) corresponds to the active current $I_{A20}$ in the present embodiment, the current $i_{dc}$ flowing through the DC bus corresponds to the DC bus current $I_{BUS}$ in the present embodiment. The active current $I_{A20}$ and the DC bus current $I_{BUS}$ have the same proportional relationship as the above formula (2) in three-phase applications. It is possible to indirectly control the DC bus current $I_{BUS}$ by controlling the active current $I_{A20}$. For non-three-phase applications, for example, in single-phase, four-phase, six-phase, and eight-phase applications, a certain proportional relationship may also exist between the active current $I_{A20}$ and the DC bus current $I_{BUS}$, which will not be described herein, and the present application does not limit it, the same as below.

With continued reference to FIG. 3A, as another embodiment of the apparatus 500 of controlling the electrical power system of the present application, similar to the structure of FIG. 2B, only different parts will be described in detail.

The detecting module 520 of the present embodiment detects the AC side voltage $V_{ABC}$ of the generator-side power converter 20, the AC side current $I_{ABC}$ of the generator-side power converter 20, and the DC bus voltage $V_{BUS}$.

The calculating module 530 of the present embodiment further includes a third reference current calculation unit 533, a Clark converter 534 and a Park converter 535. The third reference current calculation unit 533 is connected to the setting unit 510 and the detecting unit 520, to receive the virtual bus capacitance value $C_{VIR}$ and the DC bus voltage $V_{BUS}$, and calculate the expected value $I_{EXP}$ of the bus current according to the formula (1). In the calculating module 530 of the present embodiment, the Clark converter 534 and the Park converter 535 perform the aforementioned coordinate transformation on the AC side voltage $V_{ABC}$ and the AC side current $I_{ABC}$ to obtain the proportional relationship of the formula (2). The active current $I_{A20}$ is calculated according to the proportional relationship and the DC bus current $I_{BUS}$. Specifically, the AC side voltage $V_{ABC}$ is phase locked to obtain an angle θ for the coordinate transformation. The AC side voltage $V_{ABC}$ and the AC side current $I_{ABC}$ are subjected to the Clark transformation, and then the Park transformation, to obtain the D-axis voltage $u_{sd}$ on the AC side of the converter in the DQ rotating coordinate system, and the active current $I_{A20}$ is calculated. The third reference current calculation unit 533 further receives the D axis voltage $u_{sd}$, and calculates the reference value of the D axis current on the AC side of the converter based on the D axis voltage $u_{sd}$ and the expected value $I_{EXP}$ of the DC bus current $I_{BUS}$, according to the aforementioned formula (2). The reference value $i_{DREF}$ of the D axis current is the reference value of the active current $I_{A20}$.

The active current $I_{A20}$ and the DC bus current $I_{BUS}$ have the proportional relationship shown in formula (2). The reference value $i_{DREF}$ of the active current and the expected value $I_{EXP}$ also have the proportional relationship shown in formula (2). The proportional relationship of the formula (2) is obtained by the coordinate transformation described above. In the calculating module 530, the active current $I_{A20}$ is calculated according to the proportional relationship and the DC bus current $I_{BUS}$, and the reference value $i_{DREF}$ is calculated according to the proportional relationship and the expected value $I_{EXP}$.

In the adjusting module 540 of this embodiment, the active current $I_{A20}$ and its reference value $i_{DREF}$ are received. Through the closed-loop control of the active current $I_{A20}$, switch signals $S_{20}$ are formed. The switch signals $S_{20}$ control operations of each power element in the generator-side power converter 20 to adjust the active current $I_{A20}$, such that the active current $I_{A20}$ reaches the reference value $i_{DREF}$. Because the active current $I_{A20}$ and the DC bus current $I_{BUS}$ have the proportional relationship shown by the formula (2), the active current $I_{A20}$ reaches the reference value, and the DC bus current $I_{BUS}$ also reaches the expected value $I_{EXP}$. The control process behaves as that the generator-side power converter 20 injects a positive or negative current into the DC bus B, so that the DC bus current $I_{BUS}$ reaches the expected value $I_{EXP}$.

Figure 3B:
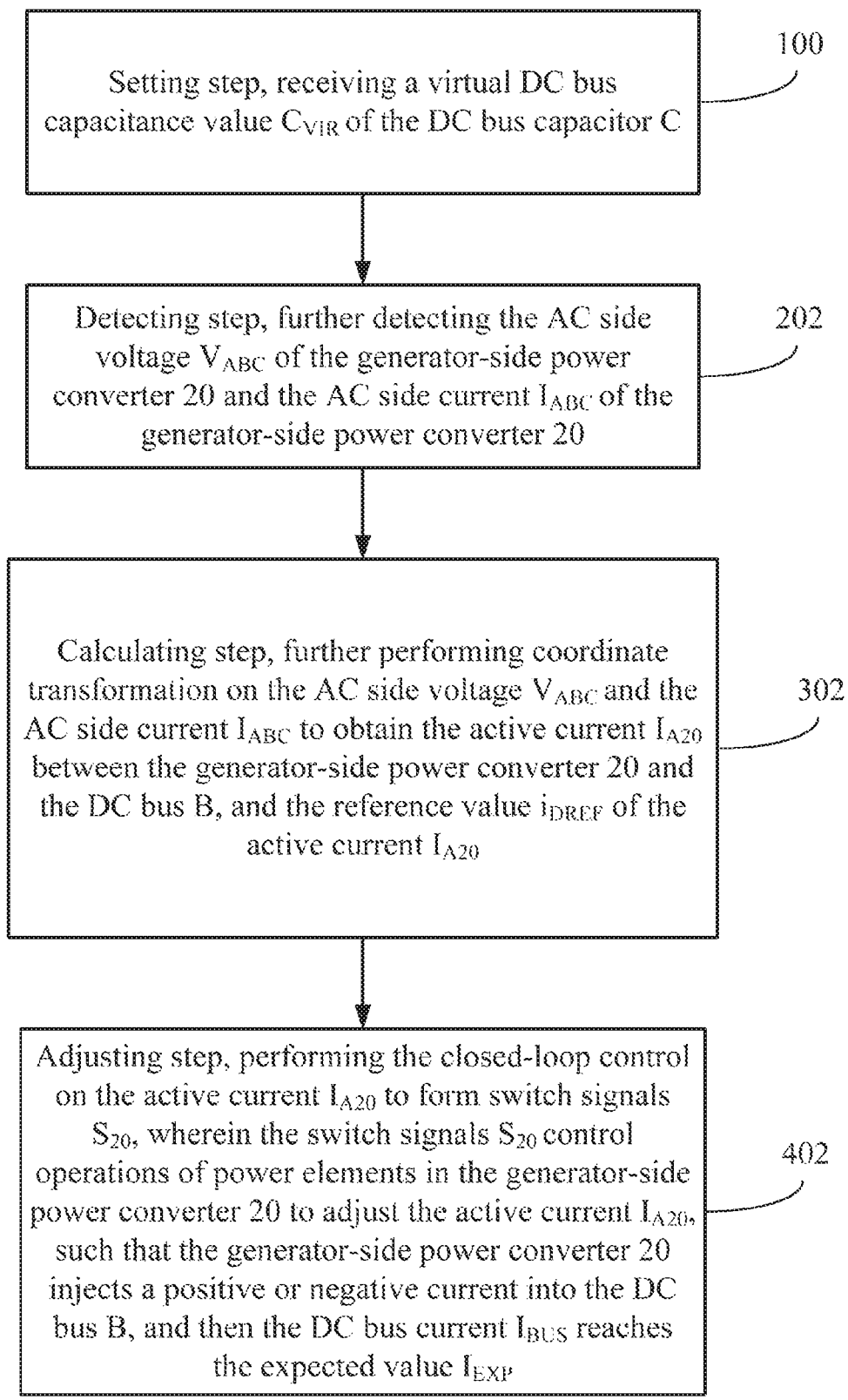
FIG. 3B is a flowchart of another embodiment of a method of controlling an electrical power system of the present application.

Accordingly, FIG. 3B is a flowchart of another embodiment of a method of controlling an electrical power system of the present application. As shown in FIG. 3B, the method of controlling the electrical power system of the present embodiment includes: a setting step 100, a detecting step 202, a calculating step 302, and an adjusting step 402.

The setting step 100, the detecting step 202, the calculating step 302, and the adjusting step 402 in FIG. 3B are similar to the foregoing setting step 100, detecting step 200, calculating step 300, and adjusting step 400. The same parts are not described repeatedly, and only the difference will be emphasized.

As another embodiment of the method of controlling the electrical power system of the present application, based on the detecting step 200 in FIG. 1B, in the detecting step 202 of the present embodiment, the AC side voltage $V_{ABC}$ and the AC side current $I_{ABC}$ of the generator-side power converter 20 further need to be detected.

Based on the calculating step 300 in FIG. 1B, in the calculating step 302 of this embodiment, the method further includes performing coordinate transformation on the AC side voltage $V_{ABC}$ and the AC side current $I_{ABC}$ to obtain an active current of the AC side current $I_{ABC}$, i.e., the active current $I_{A20}$ between the generator-side power converter 20 and the DC bus B. The reference value $i_{DREF}$ of the active current $I_{A20}$ is obtained according to the expected value $I_{EXP}$ of the DC bus current $I_{BUS}$ and the aforementioned formula (2).

The active current $I_{A20}$ and the DC bus current $I_{BUS}$ have the proportional relationship shown in formula (2). The reference value $i_{DREF}$ of the active current and the expected value $I_{EXP}$ also have the proportional relationship shown in formula (2). The proportional relationship of the formula (2) is obtained by the coordinate transformation described above. In the calculating step 302, the active current $I_{A20}$ is calculated according to the proportional relationship and the DC bus current $I_{BUS}$, and the reference value $i_{DREF}$ is calculated according to the proportional relationship and the expected value $I_{EXP}$.

Based on the adjusting step 400 in FIG. 1B, in the adjusting step 402 of the present embodiment, the switch signals $S_{20}$ are formed by performing the closed-loop control on the active current $I_{A20}$. The switch signals $S_{20}$ control operations of each power element in the generator-side power converter 20 to adjust the active current $I_{A20}$, such that the generator-side power converter 20 injects a positive or negative current into the DC bus B, and then the DC bus current $I_{BUS}$ reaches the expected value $I_{EXP}$.

In this embodiment, the active current $I_{A20}$ between the generator-side power converter 20 and the DC bus B is controlled. The generator-side power converter 20 draws electrical energy $E_{20}$ from the DC bus B when the active current $I_{A20}$ is a negative current. The generator-side power converter 20 provides the electrical energy $E_{20}$ to the DC bus B when the active current $I_{A20}$ is a positive current. Then the DC bus current $I_{BUS}$ is adjusted, which reaches the expected value $I_{EXP}$. By controlling the active current $I_{A20}$ between the generator-side power converter 20 and the DC bus B, the DC bus current $I_{BUS}$ is the indirectly controlled, such that the externally expressed characteristics of the DC bus capacitor C may be equivalent to the case when the capacitance value is the virtual DC bus capacitance value $C_{VIR}$.

In conjunction with the description of FIGS. 1A-3B, another embodiment of the electrical power system of the present application is described below with further reference to FIG. 4A.

Figure 4A:
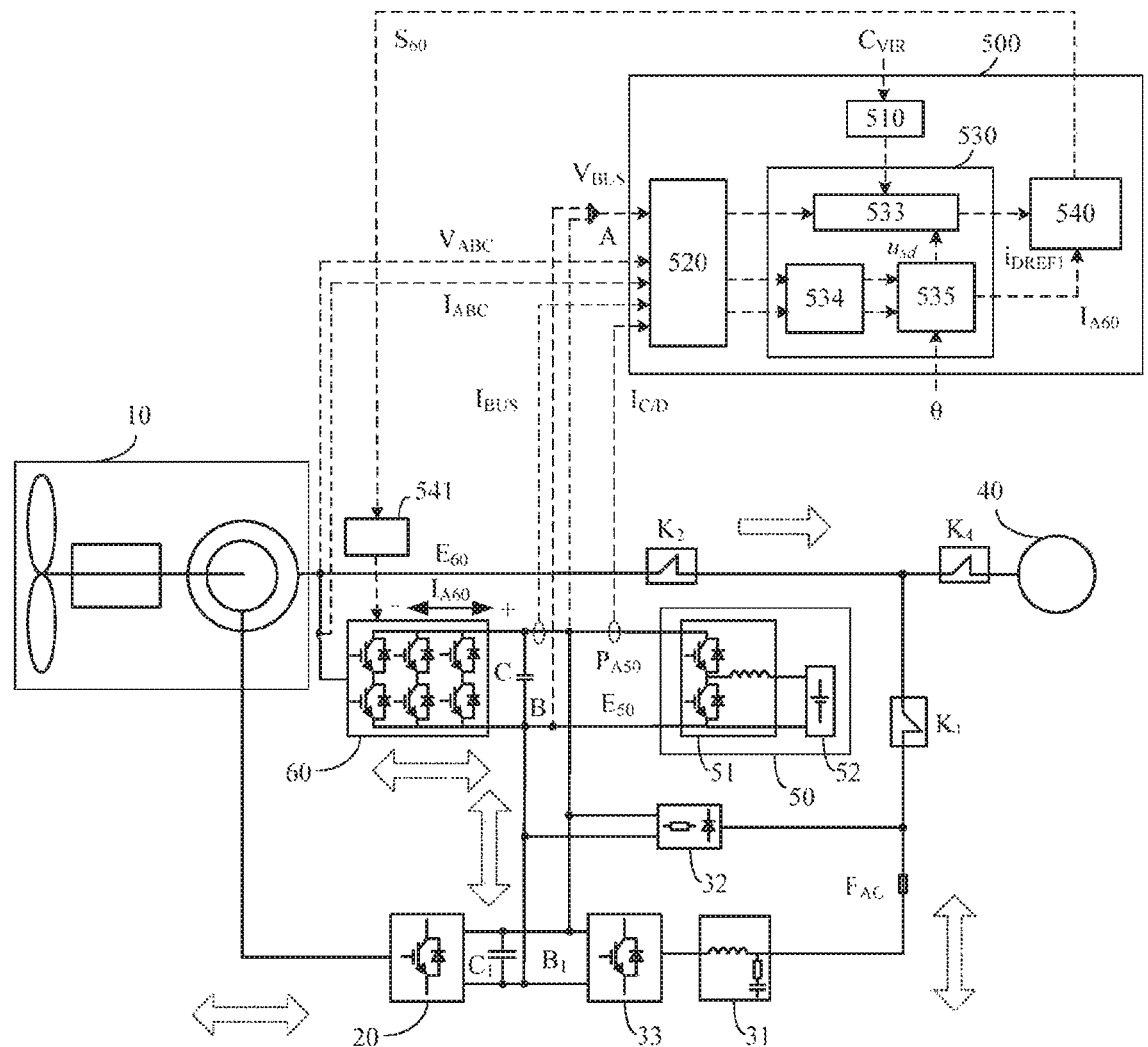
FIG. 4A is a schematic diagram of the electrical power system of the present application being a wind power generation system 4000.

FIG. 4A is a schematic diagram of the electrical power system of the present application being a wind power generation system 4000. As shown in FIG. 4A, the wind power generation system 4000 mainly includes: a wind generator 10, a generator-side power converter 20, a grid-side power converter 33, a grid 40, an energy storage module 50, a rectifier circuit 60, and an apparatus 500 of controlling the electrical power system. The DC bus capacitor $C_1$ of the converter is connected between the generator-side power converter 20 and the grid-side power converter 33 through the DC bus $B_1$ of the converter. The AC side of the generator-side power converter 20 is connected to a rotor winding of the wind generator 10, and the AC side of the grid-side power converter 33 is connected to the grid 40. The DC side of the rectifier circuit 60 is connected in parallel to the DC bus capacitor C, and the AC side of the rectifier circuit 60 is connected between the stator winding of the wind generator 10 and the grid 40. The energy storage module 50 is connected in parallel with the DC bus capacitor C through the DC bus B, to store electrical energy $E_{50}$ provided by the DC bus B or provide the electrical energy $E_{50}$ to the DC bus B. The apparatus 500 of controlling the electrical power system is connected to the AC side of the rectifier circuit 60 and the DC bus B.

The wind power generation system 4000 may further include auxiliary devices such as contactors $K_1$ and $K_2$, a main breaker $K_4$, an LC filter 31, a soft start module 32 and an AC fuse $F_{AC}$, whose connection relationship is shown in the figure. Since these devices themselves are not related to the present disclosure, their structures are not described.

As described above, the energy storage module 50 includes a charging/discharging unit 51 and an energy storage element 52. The charging/discharging unit 51 may be a bidirectional DC/DC converter of various topologies. The energy storage element 52 may be constituted by a super capacitor or a rechargeable battery, but not limited thereto. When the energy storage module 50 is in operation, the charging/discharging unit 51 charges the energy storage module 50 from the DC bus B or discharges the energy storage module 50 to the DC bus B with a charging/discharging current $I_{C/D}$, so that the DC bus B charges the energy storage module 50 or the energy storage module 50 discharges to DC bus B in an active power $P_{A50}$.

The AC side of the grid-side power converter 33 is connected to the grid 40 through the LC filter 31, the AC fuse $F_{AC}$, the contactor $K_1$ and the main breaker $K_4$, and the stator winding of the wind generator 10 is connected to the grid 40 via the contactor $K_2$ and the main breaker $K_4$. The dashed and solid arrows in FIG. 4A indicate the flow of current, electrical energy, or power. In an actual wind power generation system 4000, the rectifier circuit 60 may be various bidirectional AC-DC converters controlled by power switching elements. However, since internal composition details of the rectifier circuit 60 are not related to the present disclosure, in order to avoid drowning the essence of the present disclosure due to overly complicated description, internal details of the rectifier circuit 60 are omitted herein under the premise that those skilled in the art can understand. When the wind power generation system 4000 is in operation, electrical power may flow between the wind generator 10 and the grid 40 through the rotor windings and stator windings simultaneously. Electrical power may also flow between the wind generator 10 and the energy storage module 50 through the rotor windings and stator windings simultaneously. The functions of the circuit composed of the generator-side power converter 20 and the grid-side power converter 33 have already been described above, and therefore will not be described again. An active current $I_{A60}$ exists between the rectifier circuit 60 and the DC bus B, as indicated by the double-headed arrow in FIG. 4A. The active current $I_{A60}$ may be a positive current or a negative current, so that the rectifier circuit 60 extracts electrical energy $E_{60}$ from the DC bus B or provides the electrical energy $E_{60}$ to the DC bus B.

As another embodiment of the current control apparatus of the present application, as shown in FIG. 4A, the apparatus 500 of controlling the electrical power system of the present embodiment controls the active current $I_{A60}$ between the rectifier circuit 60 and the DC bus B, so that the active current $I_{A60}$ reaches the expected value of the active current. The rectifier circuit 60 injects a positive or negative current to the DC bus B. The rectifier circuit 60 extracts electrical energy $E_{60}$ from the DC bus B when the active current $I_{A60}$ is a negative current. The rectifier circuit 60 provides the electrical energy $E_{60}$ to the DC bus B when the active current $I_{A60}$ is a positive current. Then the DC bus current $I_{BUS}$ is adjusted.

Figure 4B:
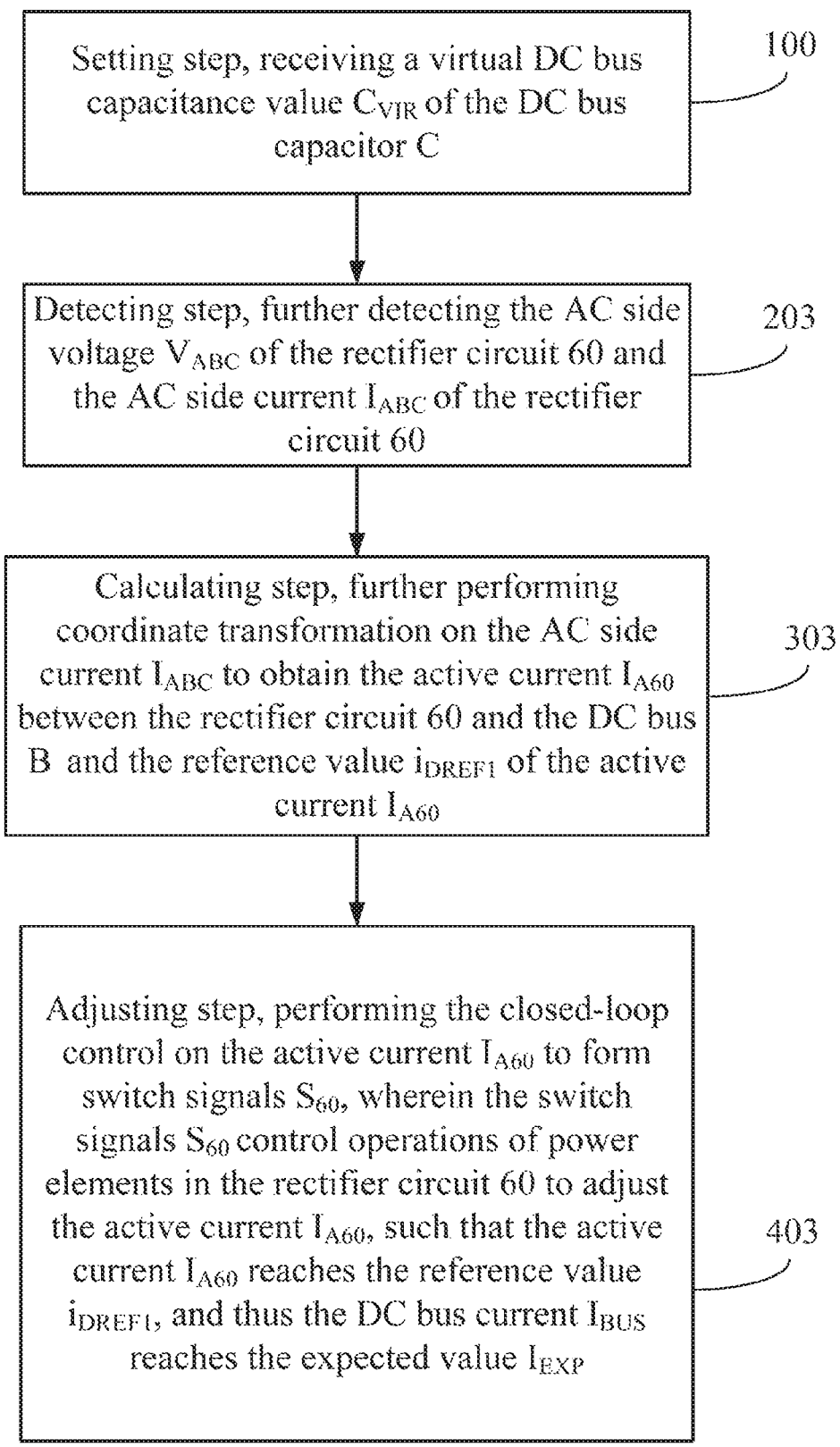
FIG. 4B is a flowchart of another embodiment of a method of controlling an electrical power system of the present application.

Correspondingly, FIG. 4B is a flowchart of another embodiment of a method of controlling an electrical power system of the present application. As shown in FIG. 4B, the method of controlling the electrical power system of this embodiment includes: a setting step 100, a detecting step 203, a calculating step 303, and an adjusting step 403.

The setting step 100, the detecting step 203, the calculating step 303, and the adjusting step 403 in FIG. 4B are similar to the foregoing setting step 100, detecting step 200, calculating step 300 and adjusting step 400. The same parts are not described repeatedly, and only the difference will be emphasized.

Based on the detecting step 200 in FIG. 1B, in the detecting step 203 of the present embodiment, the AC side voltage $V_{ABC}$ and the AC side current $I_{ABC}$ of the rectifier circuit 60 further need to be detected.

Based on the calculating step 300 in FIG. 1B, in the calculating step 303 of this embodiment, the method further includes performing coordinate transformation on the AC side voltage $V_{ABC}$ and the AC side current $I_{ABC}$ to obtain an active current of the AC side current $I_{ABC}$ and a reference value of the active current. That is to say, the active current $I_{A60}$ between the rectifier circuit 60 and the DC bus B and the reference value $i_{DREF1}$ of the active current $I_{A60}$ are calculated.

Similarly, in the present embodiment, the active current $I_{A60}$ and the DC bus current $I_{BUS}$ have the same proportional relationship as the above formula (2) in three-phase applications. The expected value $i_{DREF1}$ of the active current $I_{A60}$ is obtained according to the expected value $I_{EXP}$ of the DC bus current and the proportional relationship as the above formula (2). The DC bus current $I_{BUS}$ may be controlled indirectly by controlling the active current $I_{A60}$. When the active current $I_{A60}$ is controlled to reach the expected value $i_{DREF1}$, the DC bus current $I_{BUS}$ also reaches the expected value $I_{EXP}$.

The active current $I_{A60}$ and the DC bus current $I_{BUS}$ have a proportional relationship of formula (2). The reference value $i_{DREF1}$ of the active current and the expected value $I_{EXP}$ also have the proportional relationship of formula (2). The proportional relationship of the formula (2) is obtained by the coordinate transformation described above. In the calculating step 303, the active current $I_{A60}$ is calculated according to the proportional relationship and the DC bus current $I_BUS$, and the reference value $i_{DREF1}$ is calculated according to the proportional relationship and the expected value $I_{EXP}$.

Based on the adjusting step 400 in FIG. 1B, in the adjusting step 403 of this embodiment, switch signals $S_{60}$ are formed by performing the closed-loop control on the active current $I_{A60}$. The switch signals $S_{60}$ control operations of each power element in the rectifier circuit 60 to adjust the active current $I_{A60}$, such that the active current $I_{A60}$ reaches the expected value $i_{DREF1}$ of the active current. The rectifier circuit 60 injects a positive or negative current into the DC bus B, and thus the DC bus current $I_{BUS}$ reaches the expected value $I_{EXP}$. The adjustment process of the active current $I_{A60}$ essentially presents as that the rectifier circuit 60 injects a positive current or a negative current to the DC bus B.

In this embodiment, the active current $I_{A60}$ between the rectifier circuit 60 and the DC bus B is controlled. The rectifier circuit 60 draws electrical energy $E_{60}$ from the DC bus B when the active current $I_{A60}$ is a negative current. The rectifier circuit 60 provides the electrical energy $E_{60}$ to the DC bus B when the active current $I_{A60}$ is a positive current. Then the DC bus current $I_{BUS}$ is adjusted, such that the DC bus current $I_{BUS}$ reaches the expected value $I_{EXP}$. That is, the externally expressed characteristics of the DC bus capacitor C may be equivalent to the case when the capacitance value is the virtual DC bus capacitance value $C_{VIR}$. Because the DC bus B is connected with the DC bus $B_1$ of the converter, adjusting the parameters of the DC bus B may be equivalent to adjusting the parameters of the DC bus $B_1$. Specifically, a sum of the DC bus capacitor C and the DC bus capacitor $C_1$ of the converter forms the DC bus capacitor of the wind power generation system 4000. By making the DC bus capacitor C equivalent to the virtual capacitor value $C_{VIR}$, the DC bus capacitor of the wind power generation system may be equivalent to the expected value.

By further reference to FIG. 4A, as another embodiment of the apparatus 500 of controlling the electrical power system of the present application, in the detecting module 520 of the present embodiment, the AC side voltage $V_{ABC}$ and the AC side current $I_{ABC}$ of the rectifier circuit 60 are further detected.

In the calculating module 530 of this embodiment, the AC side voltage $V_{ABC}$ and the AC side current $I_{ABC}$ are further subjected to the aforementioned coordinate transformation to obtain the active current $I_{A60}$ and its reference value $i_{DREF1}$. Specifically, reference may be made to the description of FIG. 3A, and details are not described herein again.

The active current $I_{A60}$ and the DC bus current $I_{BUS}$ have the proportional relationship shown in formula (2). The reference value $i_{DREF1}$ of the active current and the expected value $I_{EXP}$ also have the proportional relationship shown in formula (2). The proportional relationship of the formula (2) is obtained by the coordinate transformation described above. In the calculating module 530, the active current $I_{A60}$ is calculated according to the proportional relationship and the DC bus current $I_{BUS}$, and the reference value $i_{DREF1}$ is calculated according to the proportional relationship and the expected value $I_{EXP}$.

In the adjusting module 540 of this embodiment, through the closed-loop control of the active current $I_{A60}$, the switch signals $S_{60}$ is formed. The switch signals $S_{60}$ control operations of each power element in the rectifier circuit 60 to adjust the active current $I_{A60}$, such that the active current $I_{A60}$ reaches the reference value $i_{DREF1}$ of the active current $I_{A60}$. The rectifier circuit 60 injects a positive or negative current into the DC bus B, so that the DC bus current $I_{BUS}$ reaches the expected value $I_{EXP}$.

As another embodiment of the apparatus of controlling the electrical power system of the present application, as shown in FIG. 4A, in the apparatus 500 of controlling the electrical power system of the present embodiment, an active power $P_{A50}$ charged from the DC bus to the energy storage module 50 or discharged from the energy storage module 50 to the DC bus B is controlled, so that the energy storage module 50 stores the electrical energy $E_{50}$ drawn from the DC bus B or provides the electrical energy $E_{50}$ to the DC bus B, thus adjusting the DC bus current $I_{BUS}$.

As another embodiment of the apparatus of controlling the electrical power system of the present application, as shown in FIG. 4A, in the detecting module 520 of the present embodiment, the DC bus current $I_{BUS}$ and the charging/discharging current $I_{C/D}$ of the charging/discharging unit 50 are further detected.

In the calculating module 530 of the present embodiment, the DC bus current $I_{BUS}$ is further subtracted from the expected value $I_{EXP}$ to obtain a virtual current value $I_{VIR}$.

In the adjusting module 540 of the present embodiment, a closed-loop control is performed on the charging/discharging current $I_{C/D}$ to form the switch signals $S_{50}$, and the switch signals $S_{50}$ control operations of each power element in the charging/discharging unit 50 to adjust the charging/discharging current $I_{C/D}$. Finally, the charging/discharging current $I_{C/D}$ is equal to the virtual current value $I_{VIR}$ and thus the DC bus current $I_{BUS}$ reaches the expected value $I_{EXP}$.

Correspondingly, as another embodiment of the method of controlling an electrical power system of the present application, based on the detecting step 200 in FIG. 4B, in the detecting step of the present embodiment, the DC bus current $I_{BUS}$ and the charging/discharging current $I_{C/D}$ of the charging/discharging unit 60 are further detected.

Based on the calculating step 300 in FIG. 4B, in the calculating step of this embodiment, the DC bus current $I_{BUS}$ is further subtracted from the expected value $I_{EXP}$ to obtain a virtual current value $I_{VIR}$.

Based on the adjusting step 403 in FIG. 4B, in the adjusting step of this embodiment, a closed-loop control is performed on the charging/discharging current $I_C/D$ to form the switch signals $S_{50}$, and the switch signal $S_{50}$ control operations of each power element in the charging/discharging unit 50 to adjust the charging/discharging current $I_{C/D}$, such that the charging/discharging current $I_{C/D}$ is equal to the virtual current value $I_{VIR}$ and thus the DC bus current $I_{BUS}$ reaches the expected value $I_{EXP}$.

As another embodiment of the apparatus of controlling the electrical power system of the present application, the DC bus capacitance of the wind power generation system 4000 may be equivalent to the expected value by making the DC bus capacitance $C_1$ of the converter equivalent to its corresponding virtual capacitance value. As shown in FIG. 4A, in the apparatus 500 of controlling the electrical power system, the active current $I_{A20}$ between the generator-side power converter 20 and the DC bus $B_1$ of the converter is controlled, such that the active current $I_{A20}$ is a positive or negative current, and then the generator-side power converter 20 draws electrical energy $E_{20}$ from the DC bus $B_1$ or provides the electrical energy $E_{20}$ to the DC bus $B_1$. The current of the DC bus $B_1$ of the converter is adjusted.

It should be noted that, the DC bus capacitance of the wind power generation system 4000 may be equivalent to the expected value by making the DC bus capacitance $C_1$ of the converter be equivalent to its corresponding virtual capacitance value and simultaneously making the DC bus capacitance C be equivalent to the virtual capacitor value $C_{VIR}$.

In this embodiment, the DC bus current of the wind power generation system 4000 can be adjusted, by controlling the active current between the generator-side power converter 20 and the converter DC bus $B_1$, the active current $I_{A60}$ between the rectifier circuit 60 and the DC bus B, and the charging/discharging current $I_{C/D}$ Of the energy storage module 50, at the same time. The DC bus current of the wind power generation system 4000 can be adjusted, by controlling at least one of the active current between the generator-side power converter 20 and the converter DC bus $B_1$, the active current between the rectifier circuit 60 and the DC bus B, and the charging/discharging current $I_{C/D}$ of the energy storage module 50. Finally, the DC bus current of the wind power generation system 4000 reaches the expected value. For example, the DC bus current $I_{BUS}$ can be adjusted, only by controlling the active power $P_{A50}$ for charging the energy storage module 50 from the DC bus B or discharging the energy storage module 50 to the DC bus B. The energy storage module 50 stores the electrical energy $E_{50}$ extracted from the DC bus B or provides the electrical energy $E_{50}$ to the DC bus B, so that the DC bus current $I_{BUS}$ reaches the expected value $I_{EXP}$. The externally expressed characteristics of the DC bus capacitor C may be equivalent to the case when the capacitance value is the virtual DC bus capacitance value $C_{VIR}$. According to the capacity of the energy storage module 50, the rectifier circuit 60 and the generator-side power converter 20 and actual requirements, the adjustment function of the DC bus in the wind power generation system 4000 may be flexibly configured, such that the bus capacitance of the wind power generation system 4000 may present its expected equivalent capacitance value.

In addition, the rectifier circuit 60 may not only be used to adjust the bus current to virtualize the bus capacitance, but also be used as a dual mode switch to switch the wind power generation system 4000 between the full power generation mode and the doubly fed power generation mode. Further, when a wind speed is less than a preset wind speed, the rectifier circuit 60 switches the wind power generation system 4000 to the full power generation mode. On the contrary, when the wind speed is greater than or equal to the preset wind speed, the rectifier circuit 60 switches the wind power generation system 4000 to the doubly fed power generation mode. In this way, the wind power generation system of the present embodiment can perform the full power generation mode at low wind speeds without increasing the cost, so as to still have good power generation efficiency at low wind speeds and increase the range of power generation operation.

The energy storage module 50 is disposed between the main breaker and the wind generating set. The energy storage module 50 may be used not only to adjust the bus current to virtualize the bus capacitance, but also to suppress events unfavorable to the grid 40 and the wind power generation system 4000, such as grid frequency fluctuations, output power fluctuations of the wind generator and the like, by performing charging or discharging operation. In some embodiments, the energy storage module 50 and the grid-side power converter 33 may actually be integrated together in a cabinet (not shown), to save the cost of the wind power generation system.

An actual DC bus capacitance value is fixed. Considering the high-frequency ripple, the capacitance should not be excessively reduced. Depending on a virtual DC bus capacitor technology proposed by the present application, a DC bus capacitor is virtualized at a low frequency to change the actual bus capacitance value as required, thus further improving the grid-connection stability. On the other hand, if the stability problem is not considered, a positive capacitor may also be virtualized to reduce the cost of DC bus capacitor.

The present disclosure has been described by the above-described related embodiments. However, the above-described embodiments are merely examples of the present application. It is to be noted that the disclosed embodiments do not limit the scope of the present disclosure. Rather, changes and modifications without departing from the spirit and scope of the present disclosure all belong to the patent protection of the present disclosure.

What is claimed is:

1. A method of controlling an electrical power system, wherein the electrical power system comprises: a DC bus and a DC bus capacitor connected to the DC bus, and the method comprises:
    a setting step, receiving a virtual DC bus capacitance value of the DC bus capacitor, wherein the virtual DC bus capacitance value of the DC bus capacitor is an equivalent capacitance value that is expected to be presented by the DC bus capacitor;
    a detecting step, detecting a DC bus voltage of the DC bus;
    a calculating step, calculating an expected value of a DC bus current of the DC bus based on the virtual DC bus capacitance value and the DC bus voltage; and
    an adjusting step, adjusting the DC bus current, such that the DC bus current reaches the expected value and thus the DC bus capacitor presents to be equivalent to the virtual DC bus capacitance value.

2. The method of controlling an electrical power system according to claim 1, wherein the electrical power system further comprises an energy storage module connected in parallel with the DC bus to store electrical energy provided by the DC bus or provide electrical energy to the DC bus, and in the adjusting step, an active power charged from the DC bus to the energy storage module is controlled, which makes the energy storage module draw electrical energy from the DC bus so as to adjust the DC bus current; or
in the adjusting step, an active power discharged from the energy storage module to the DC bus is controlled, which makes the energy storage module provide electrical energy to the DC bus so as to adjust the DC bus current.

3. The method of controlling an electrical power system according to claim 2, wherein the energy storage module comprises an energy storage element and a charging/discharging unit,
    in the detecting step, the DC bus current and a charging/discharging current of the charging/discharging unit are further detected,
    in the calculating step, the DC bus current is further subtracted from the expected value of the DC bus current to obtain a virtual current value, and
    in the adjusting step, a closed-loop control is performed on the charging/discharging current to form switch signals, and the switch signals control operations of power elements in the charging/discharging unit to adjust the charging/discharging current, such that the charging/discharging current is equal to the virtual current value and thus the DC bus current reaches the expected value.

4. The method of controlling an electrical power system according to claim 1, wherein the electrical power system further comprises a generator-side power converter and a grid-side power converter, and the DC bus capacitor is connected between the generator-side power converter and the grid-side power converter through the DC bus, and
    in the adjusting step, an active current between the generator-side power converter and the DC bus is controlled, which makes the generator-side power converter draw electrical energy from the DC bus or provide electrical energy to the DC bus, so as to adjust the DC bus current.

5. The method of controlling an electrical power system according to claim 4, wherein
    in the detecting step, an AC side voltage of the generator-side power converter and an AC side current of the generator-side power converter are further detected,
    in the calculating step, a coordinate transformation is further performed on the AC side voltage and the AC side current to obtain the active current and a reference value of the active current, and
    in the adjusting step, switch signals are formed by performing a closed-loop control on the active current, and the switch signals control operations of power elements in the generator-side power converter to adjust the active current, such that the active current reaches the reference value of the active current and thus the DC bus current reaches the expected value of the DC bus current.

6. The method of controlling an electrical power system according to claim 5, wherein the active current has a proportional relationship with the DC bus current, the reference value of the active current has the proportional relationship with the expected value, the proportional relationship is obtained by the coordinate transformation, and in the calculating step, the active current is calculated according to the proportional relationship and the DC bus current, and the reference value is calculated according to the proportional relationship and the expected value.

7. The method of controlling an electrical power system according to claim 1, wherein the electrical power system further comprises a doubly-fed wind generator, a generator-side power converter, a grid-side power converter and a rectifier circuit, a DC side of the rectifier circuit is connected in parallel to the DC bus capacitor, and an AC side of the rectifier circuit is connected between a stator winding of the doubly-fed wind power generator and a power grid, and in the adjusting step, by controlling an active current between the rectifier circuit and the DC bus is controlled, which makes the rectifier circuit draw electrical energy from the DC bus or provide electrical energy to the DC bus, so as to adjust the DC bus current.

8. The method of controlling an electrical power system according to claim 7, wherein in the detecting step, an AC side voltage of the rectifier circuit and an AC side current of the rectifier circuit are further detected, in the calculating step, a coordinate transformation is performed on the AC side voltage and the AC side current, to obtain the active current and a reference value of the active current, and in the adjusting step, switch signals are formed by performing a closed-loop control on the active current, and the switch signals control operations of power elements in the rectifier circuit to adjust the active current, such that the active current reaches the reference value of the active current and thus the DC bus current reaches the expected value.

9. The method of controlling an electrical power system according to claim 8, wherein the active current has a proportional relationship with the DC bus current, the reference value of the active current has the proportional relationship with the expected value, the proportional relationship is obtained by the coordinate transformation, and in the calculating step, the active current is calculated according to the proportional relationship and the DC bus current, and the reference value is calculated according to the proportional relationship and the expected value.

10. The method of controlling an electrical power system according to claim 7, wherein the electrical power system further comprises an energy storage module connected in parallel with the DC bus to store electrical energy provided by the DC bus or provide electrical energy to the DC bus, and in the adjusting step, an active power charged from the DC bus to the energy storage module is controlled, which makes the energy storage module draw electrical energy from the DC bus so as to adjust the DC bus current;

or in the adjusting step, an active power discharged from the energy storage module to the DC bus is controlled, which makes the energy storage module provide electrical energy to the DC bus so as to adjust the DC bus current.

11. An apparatus of controlling an electrical power system, wherein the electrical power system comprises: a DC bus and a DC bus capacitor connected to the DC bus, and the apparatus comprises:

a setting module, configured to receive a virtual DC bus capacitance value of the DC bus capacitor, wherein the virtual DC bus capacitance value of the DC bus capacitor is an equivalent capacitance value that is expected to be presented by the DC bus capacitor;

a detecting module, configured to detect a DC bus voltage of the DC bus;

a calculating module, configured to calculate an expected value of a DC bus current of the DC bus based on the virtual DC bus capacitance value and the DC bus voltage; and an adjusting module, configured to adjust the DC bus current, such that the DC bus current reaches the expected value and thus the DC bus capacitor presents to be equivalent to the virtual DC bus capacitance value.

12. The apparatus of controlling an electrical power system according to claim 11, wherein the electrical power system further comprises an energy storage module connected in parallel with the DC bus to store electrical energy provided by the DC bus or provide electrical energy to the DC bus, and the adjusting module is configured to control an active power charged from the DC bus to the energy storage module, which makes the energy storage module draw electrical energy from the DC bus so as to adjust the DC bus current; or the adjusting module is configured to control an active power discharged from the energy storage module to the DC bus, which makes the energy storage module provide electrical energy to the DC bus so as to adjust the DC bus current.

13. The apparatus of controlling an electrical power system according to claim 12, wherein the energy storage module comprises an energy storage element and a charging/discharging unit, the detecting module further detects the DC bus current and a charging/discharging current of the charging/discharging unit, the calculating module subtracts the DC bus current from the expected value of the DC bus current to obtain a virtual current value, and the adjusting module performs a closed-loop control on the charging/discharging current to form switch signals, and the switch signals control operations of power elements in the charging/discharging unit to adjust the charging/discharging current, such that the charging/discharging current is equal to the virtual current value and thus the DC bus current reaches the expected value.

14. The apparatus of controlling an electrical power system according to claim 11, wherein the electrical power system further comprises a generator-side power converter and a grid-side power converter, and the DC bus capacitor is connected between the generator-side power converter and the grid-side power converter through the DC bus, and the adjusting module controls an active current between the generator-side power converter and the DC bus, which makes the generator-side power converter draw electrical energy from the DC bus or provides electrical energy to the DC bus, so as to adjust the DC bus current.

15. The apparatus of controlling an electrical power system according to claim 14, wherein the detecting module further detects an AC side voltage of the generator-side power converter and an AC side current of the generator-side power converter, the calculating module performs a coordinate transformation on the AC side voltage and the AC side current to obtain the active current and a reference value of the active current, and the adjusting module performs a closed-loop control on the active current to form switch signals, and the switch signals control operations of power elements in the generator-side power converter to adjust the active current, such that the active current reaches the reference value of the active current and thus the DC bus current reaches the expected value of the DC bus current.

16. The apparatus of controlling an electrical power system according to claim 15, wherein the active current has a proportional relationship with the DC bus current, the reference value of the active current has the proportional relationship with the expected value, the proportional relationship is obtained by the coordinate transformation, and the calculating module calculates the active current according to the proportional relationship and the DC bus current, and the reference value according to the proportional relationship and the expected value.

17. The apparatus of controlling an electrical power system according to claim 11, wherein the electrical power system further comprises a doubly-fed wind generator, a generator-side power converter, a grid-side power converter and a rectifier circuit, a DC side of the rectifier circuit is connected in parallel to the DC bus capacitor, and an AC side of the rectifier circuit is connected between a stator winding of the doubly-fed wind power generator and a power grid, and the adjusting module controls an active current between the rectifier circuit and the DC bus, which makes the rectifier circuit draw electrical energy from the DC bus or provide electrical energy to the DC bus, so as to adjust the DC bus current.

18. The apparatus of controlling an electrical power system according to claim 17, wherein the detecting module further detects an AC side voltage of the rectifier circuit and an AC side current of the rectifier circuit, the calculating module performs a coordinate transformation on the AC side voltage and the AC side current, to obtain the active current and a reference value of the active current, and the adjusting module performs a closed-loop control on the active current to form switch signals, and the switch signals control operations of power elements in the rectifier circuit to adjust the active current, such that the active current reaches the reference value of the active current and thus the DC bus current reaches the expected value.

19. The apparatus of controlling an electrical power system according to claim 18, wherein the active current has a proportional relationship with the DC bus current, the reference value of the active current has the proportional relationship with the expected value, the proportional relationship is obtained by the coordinate transformation, and the calculating module calculates the active current according to the proportional relationship and the DC bus current, and the reference value according to the proportional relationship and the expected value.

20. The apparatus of controlling an electrical power system according to claim 17, wherein the electrical power system further comprises an energy storage module connected in parallel with the DC bus to store electrical energy provided by the DC bus or provide electrical energy to the DC bus, and the adjusting module controls an active power charged from the DC bus to the energy storage module which makes the energy storage module draw electrical energy from the DC bus so as to adjust the DC bus current; or the adjusting module controls an active power discharged from the energy storage module to the DC bus, which makes the energy storage module provide electrical energy to the DC bus so as to adjust the DC bus current.

* * * * *